(12) United States Patent
Yang (10) Patent No.: US 11,933,096 B2
(45) Date of Patent: Mar. 19, 2024

(54) APPARATUS FOR CONTROLLING WINDOW OF VEHICLE AND METHOD THEREOF

(71) Applicants: Hyundai Motor Company, Seoul (KR); Kia Corporation, Seoul (KR)

(72) Inventor: Hee Tae Yang, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 339 days.

(21) Appl. No.: 17/488,038

(22) Filed: Sep. 28, 2021

(65) Prior Publication Data
US 2022/0356745 A1 Nov. 10, 2022

(30) Foreign Application Priority Data
May 10, 2021 (KR) .......................... 10-2021-0060242

(51) Int. Cl.
*E05F 15/695* (2015.01)
*B60J 1/17* (2006.01)
*E05F 15/73* (2015.01)

(52) U.S. Cl.
CPC ............... *E05F 15/695* (2015.01); *B60J 1/17* (2013.01); *E05F 15/73* (2015.01); *E05Y 2400/45* (2013.01); *E05Y 2900/55* (2013.01)

(58) Field of Classification Search
CPC ......... E05F 15/695; E05F 15/73; E05F 15/70; E05F 15/41; B60J 1/17; E05Y 2400/45; E05Y 2900/55; E05Y 2400/324; E05Y 2400/332; E05Y 2400/358; E05Y 2400/54; E05Y 2400/552; E05Y 2900/508; B60R 16/02; B60Y 2400/30
See application file for complete search history.

(56) References Cited

U.S. PATENT DOCUMENTS 9,556,661 B2   1/2017   Iacovoni et al.
2012/0234621 A1*  9/2012   Syvret ................... E05F 15/70
                                                 49/495.1

FOREIGN PATENT DOCUMENTS

EP       0995874 A2 * 10/1999
KR   10-1997-0044018 A    7/1997
KR   10-2015-0122997 A   11/2015

OTHER PUBLICATIONS

Machine Translation of EP-0995874-A2 (Year: 1999).*

* cited by examiner

*Primary Examiner* — Alan D Hutchinson
(74) *Attorney, Agent, or Firm* — MORGAN, LEWIS & BOCKIUS LLP (57) ABSTRACT

A window control apparatus of a vehicle and a method thereof may include a sensor that collects state information of the vehicle, and a controller that subdivides an entire short drop section of a frameless window provided in the vehicle into a plurality of short drop sections, and performs a transition of the frameless window between a full closed state of the frameless window and a plurality of shot drop states corresponding to the plurality of shot drop sections, based on the state information of the vehicle.

8 Claims, 7 Drawing Sheets

APPARATUS FOR CONTROLLING WINDOW OF VEHICLE AND METHOD THEREOF

CROSS-REFERENCE TO RELATED APPLICATION

The present application claims priority to Korean Patent Application No. 10-2021-0060242, filed on May 10, 2021, the entire contents of which is incorporated herein for all purposes by this reference.

BACKGROUND OF THE INVENTION

Field of the Invention

The present invention relates to a technology that controls a short drop of a frameless window provided in a vehicle.

Description of Related Art

In general, a door of a vehicle prevents external noise or rainwater from flowing into an interior of the vehicle, by including a frame in which an end portion of the window is drawn in and in close contact when the window provided in the door is completely closed.

A frameless window refers to a window in which the frame is not provided in the door but is provided in a vehicle body, and a vehicle provided with such a frameless window performs a short drop of the window (window glass) when the door is opened. In the instant case, the short drop means dropping a window inserted into a pocket of the frame provided in the vehicle body by a certain amount for smooth opening of the door.

A vehicle provided with the frameless window initiates the short drop of a window corresponding to a door handle when a door switch (door latch) is completely released by a user's manipulation of the door handle. Due to the provided configuration, since the door starts to open in a state where the shot drop of the window is not completed, the end portion of the window is caught on the frame provided in the vehicle body, so that the door cannot be opened smoothly or the end portion of the door may be sometimes broken.

As a related art, a technique for implementing a low pocket depth of the frame provided on the vehicle body is provided. However, in this related art, since the pocket depth of the frame is lowered, it is difficult to completely block external noise (wind noise) and rainwater, which is basic functions of the frame.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a window control apparatus of a vehicle and a window control method configured for opening a frameless window without being caught in a frame while maintaining a pocket depth of the frame provided in a vehicle body, by subdividing an entire short drop section of a frameless window provided in the vehicle into a plurality of short drop sections, and performing a transition of the frameless window between a full closed state of the frameless window and a plurality of shot drop states, based on state information of the vehicle.

The technical problems to be solved as various exemplary embodiments of the present invention are not limited to the aforementioned problems, and any other technical problems not mentioned herein will be clearly understood from the following description by those skilled in the art to which various exemplary embodiments of the present invention pertains. Furthermore, it will be readily apparent that the objects and advantages of the present invention may be realized by the means and combinations thereof indicated in the appended claims.

According to various aspects of the present invention, a window control apparatus includes a sensor that collects state information of the vehicle, and a controller that subdivides an entire short drop section of a frameless window provided in the vehicle into a plurality of short drop sections, and performs a transition of the frameless window between a full closed state of the frameless window and a plurality of shot drop states corresponding to the plurality of shot drop sections, based on the state information of the vehicle.

In various exemplary embodiments of the present invention, the controller may divide a state of the frameless window into a full closed state in which the frameless window is drawn into a pocket of a frame provided on a vehicle body and is in close contact with the pocket, a first short drop state in which the frameless window is dropped by a reference value from the pocket of the frame, and a second shot drop state in which the frameless window is completely separated from the pocket of the frame.

In various exemplary embodiments of the present invention, the controller may perform a transition of the frameless window from the full closed state to the first short drop state when a door unlocking of the vehicle is detected.

In various exemplary embodiments of the present invention, the controller may perform a transition of the frameless window from the first short drop state to the second short drop state when the controller determines that a user starts to manipulate a door handle of the vehicle.

In various exemplary embodiments of the present invention, the controller may perform a transition of the frameless window from the second short drop state to the first short drop state when a door closing of the vehicle is detected.

In various exemplary embodiments of the present invention, the controller may perform a transition of the frameless window from the first short drop state to the full closed state when a door locking of the vehicle is detected.

In various exemplary embodiments of the present invention, the controller may perform a transition of the frameless window from the full closed state to the first short drop state when a door unlocking of the vehicle is detected, a transition of the frameless window from the first short drop state to the second short drop state when the controller determines that a user starts to manipulate an outside door handle of the vehicle, a transition of the frameless window from the second short drop state to the first short drop state when a door closing of the vehicle is detected, and a transition of the frameless window from the first short drop state to the full closed state when a door locking of the vehicle is detected.

In various exemplary embodiments of the present invention, the controller may perform a transition of the frameless window from the full closed state to the first short drop state when a door unlocking of the vehicle is detected, a transition of the frameless window from the first short drop state to the second short drop state when the controller determines that a user starts to manipulate an outside door handle of the vehicle, a transition of the frameless window from the second short drop state to the first short drop state when a seat belt fastening of the vehicle is detected, and a transition of the frameless window from the first short drop state to the full closed state when a door locking of the vehicle is detected.

In various exemplary embodiments of the present invention, the controller may perform a transition of the frameless window from the full closed state to the first short drop state when a door unlocking of the vehicle is detected, a transition of the frameless window from the first short drop state to the second short drop state when the controller determines that a user starts to manipulate an inside door handle of the vehicle, a transition of the frameless window from the second short drop state to the first short drop state when a door closing of the vehicle is detected, and a transition of the frameless window from the first short drop state to the full closed state when a door locking of the vehicle is detected.

In various exemplary embodiments of the present invention, the controller may perform a transition of the frameless window from the full closed state to the first short drop state when a seat belt fastening of the vehicle is detected, a transition of the frameless window from the first short drop state to the second short drop state when the controller determines that a user starts to manipulate an inside door handle of the vehicle, a transition of the frameless window from the second short drop state to first short drop state when a door closing of the vehicle is detected, and a transition of the frameless window from the first short drop state to the full closed state when a door locking of the vehicle is detected.

According to various aspects of the present invention, a window control method of a vehicle includes collecting, by a sensor, state information of the vehicle, and subdividing, by a controller, an entire short drop section of a frameless window provided in the vehicle into a plurality of short drop sections, and performing, by the controller, a transition of the frameless window between a full closed state of the frameless window and a plurality of shot drop states corresponding to the plurality of shot drop sections, based on the state information of the vehicle.

In various exemplary embodiments of the present invention, the performing of the transition may include dividing a state of the frameless window into a full closed state in which the frameless window is drawn into a pocket of a frame provided on a vehicle body and is in close contact with the pocket, a first short drop state in which the frameless window is dropped by a reference value from the pocket of the frame, and a second shot drop state in which the frameless window is completely separated from the pocket of the frame.

In various exemplary embodiments of the present invention, the performing of the transition may include performing a transition of the frameless window from the full closed state to the first short drop state when a door unlocking of the vehicle is detected.

In various exemplary embodiments of the present invention, the performing of the transition may include performing a transition of the frameless window from the first short drop state to the second short drop state when the controller determines that a user starts to manipulate a door handle of the vehicle.

In various exemplary embodiments of the present invention, the performing of the transition may include performing a transition of the frameless window from the second short drop state to the first short drop state when a door closing of the vehicle is detected.

In various exemplary embodiments of the present invention, the performing of the transition may include performing a transition of the frameless window from the first short drop state to the full closed state when a door locking of the vehicle is detected.

In various exemplary embodiments of the present invention, the performing of the transition may include performing a transition of the frameless window from the full closed state to the first short drop state when a door unlocking of the vehicle is detected, performing a transition of the frameless window from the first short drop state to the second short drop state when the controller determines that a user starts to manipulate an outside door handle of the vehicle, performing a transition of the frameless window from the second short drop state to the first short drop state when a door closing of the vehicle is detected, and performing a transition of the frameless window from the first short drop state to the full closed state when a door locking of the vehicle is detected.

In various exemplary embodiments of the present invention, the performing of the transition may include performing a transition of the frameless window from the full closed state to the first short drop state when a door unlocking of the vehicle is detected, performing a transition of the frameless window from the first short drop state to the second short drop state when the controller determines that a user starts to manipulate an outside door handle of the vehicle, performing a transition of the frameless window from the second short drop state to the first short drop state when a seat belt fastening of the vehicle is detected, and performing a transition of the frameless window from the first short drop state to the full closed state when a door locking of the vehicle is detected.

In various exemplary embodiments of the present invention, the performing of the transition may include performing a transition of the frameless window from the full closed state to the first short drop state when a door unlocking of the vehicle is detected, performing a transition of the frameless window from the first short drop state to the second short drop state when the controller determines that a user starts to manipulate an inside door handle of the vehicle, performing a transition of the frameless window from the second short drop state to the first short drop state when a door closing of the vehicle is detected, and performing a transition of the frameless window from the first short drop state to the full closed state when a door locking of the vehicle is detected.

In various exemplary embodiments of the present invention, the performing of the transition may include performing a transition of the frameless window from the full closed state to the first short drop state when a seat belt fastening of the vehicle is detected, performing a transition of the frameless window from the first short drop state to the second short drop state when the controller determines that a user starts to manipulate an inside door handle of the vehicle, performing a transition of the frameless window from the second short drop state to first short drop state when a door closing of the vehicle is detected, and performing a transition of the frameless window from the first short drop state to the full closed state when a door locking of the vehicle is detected.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of the related known configuration or function will be omitted when it is determined that it interferes with the understanding of the exemplary embodiment of the present invention.

In describing the components of the exemplary embodiment according to various exemplary embodiments of the present invention, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

Figure 1:
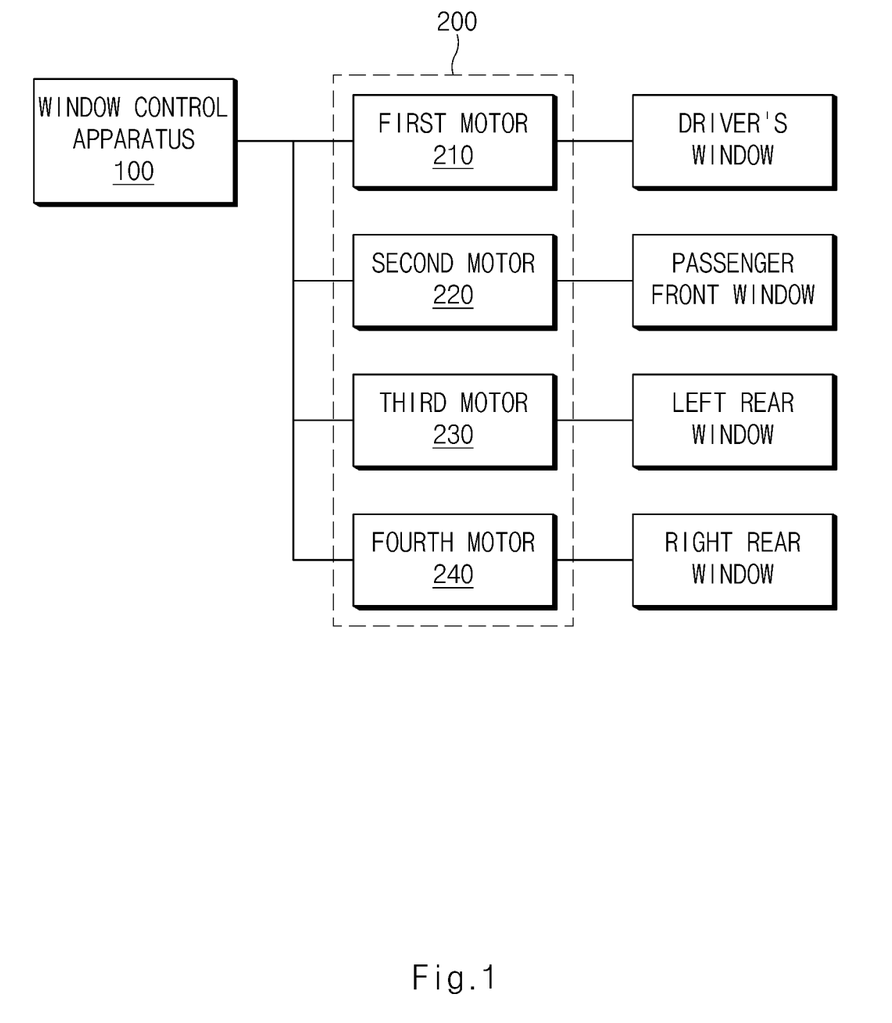
FIG. 1 is a block diagram illustrating a window control system of a vehicle according to various exemplary embodiments of the present invention.

FIG. 1 is a block diagram illustrating a window control system of a vehicle according to various exemplary embodiments of the present invention.

As illustrated in FIG. 1, a window control system of a vehicle according to various exemplary embodiments of the present invention may include a window control apparatus 100 and a window driving device 200.

Looking at each of the components, first, the window control apparatus 100 may open a frameless window 21 without being caught in a frame while maintaining a pocket depth of the frame provided in a vehicle body, by subdividing an entire short drop section of the frameless window 21 provided in the vehicle into a plurality of short drop sections, and performing a transition of the frameless window between a full closed state (a maximum rising state) of the frameless window 21 and a plurality of shot drop states, based on state information of the vehicle. In the instant case, the frameless window 21 is as illustrated in FIG. 2.

Figure 2:
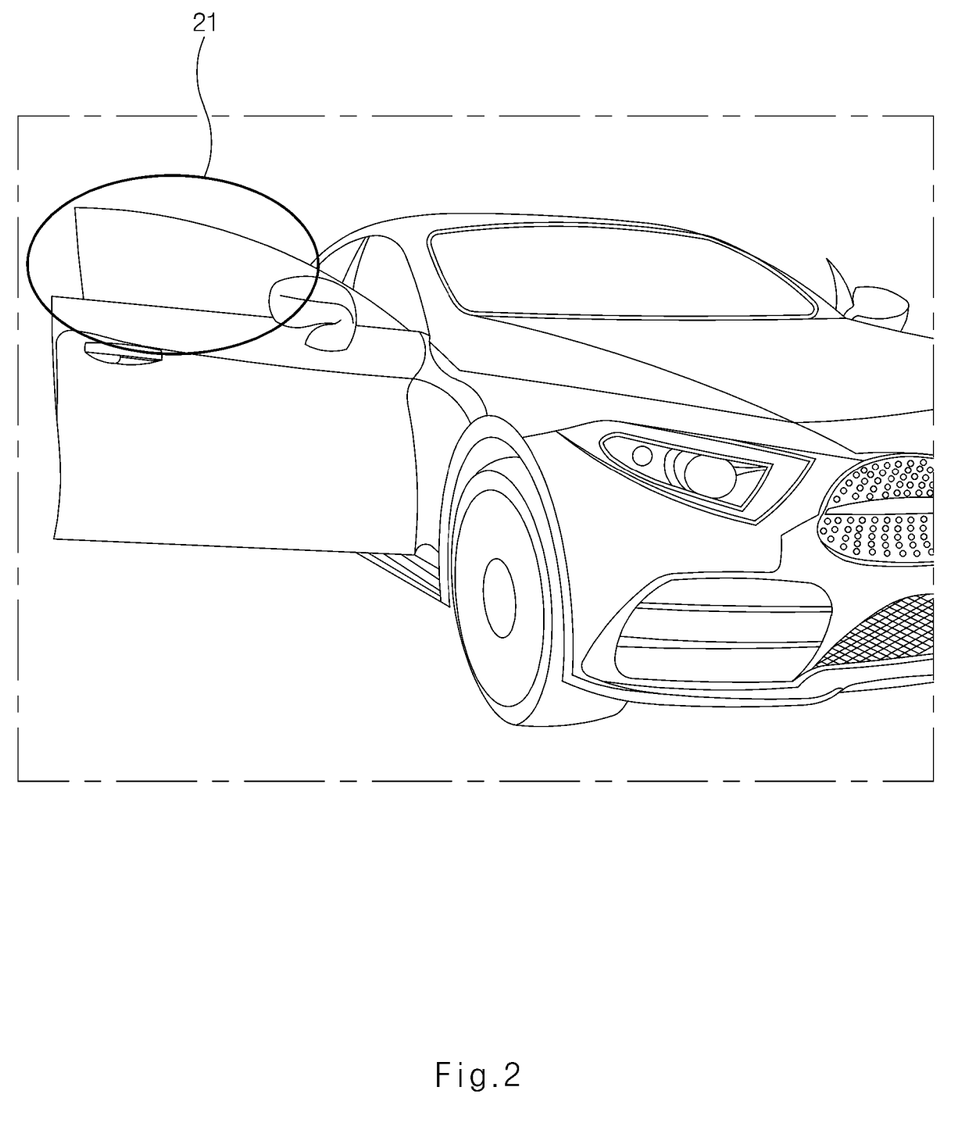
FIG. 2 is a diagram illustrating a frameless window of a vehicle used in various exemplary embodiments of the present invention.

FIG. 2 is a diagram illustrating a frameless window of a vehicle used in various exemplary embodiments of the present invention.

As illustrated in FIG. 2, the frameless window 21 used in various exemplary embodiments of the present invention is mounted on a door of a vehicle, but when the frameless window 21 is raised to the maximum, the frame to which the end portion of the frameless window 21 is drawn in and is in close contact with is not provided in the door of the vehicle but is provided in the vehicle body.

Furthermore, the window control apparatus 100 may subdivide an entire shot drop of the frameless window 21 provided in the vehicle, as an example, into a first shot drop and a second shot drop, and may interlock with the window driving device 200 to control a transition among the full closed state, the first shot drop, and the second shot drop.

The window driving device 200 is a kind of actuator that drives the frameless window 21 provided in each door of the vehicle, and may include a first motor 210 that opens or closes the frameless window 21 provided in a driver's door, a second motor 220 that opens or closes the frameless window 21 provided in a front passenger door, a third motor 230 that opens or closes the frameless window 21 provided in a left rear door, and a fourth motor 240 that opens or closes the frameless window 21 provided in a right rear door.

Figure 3:
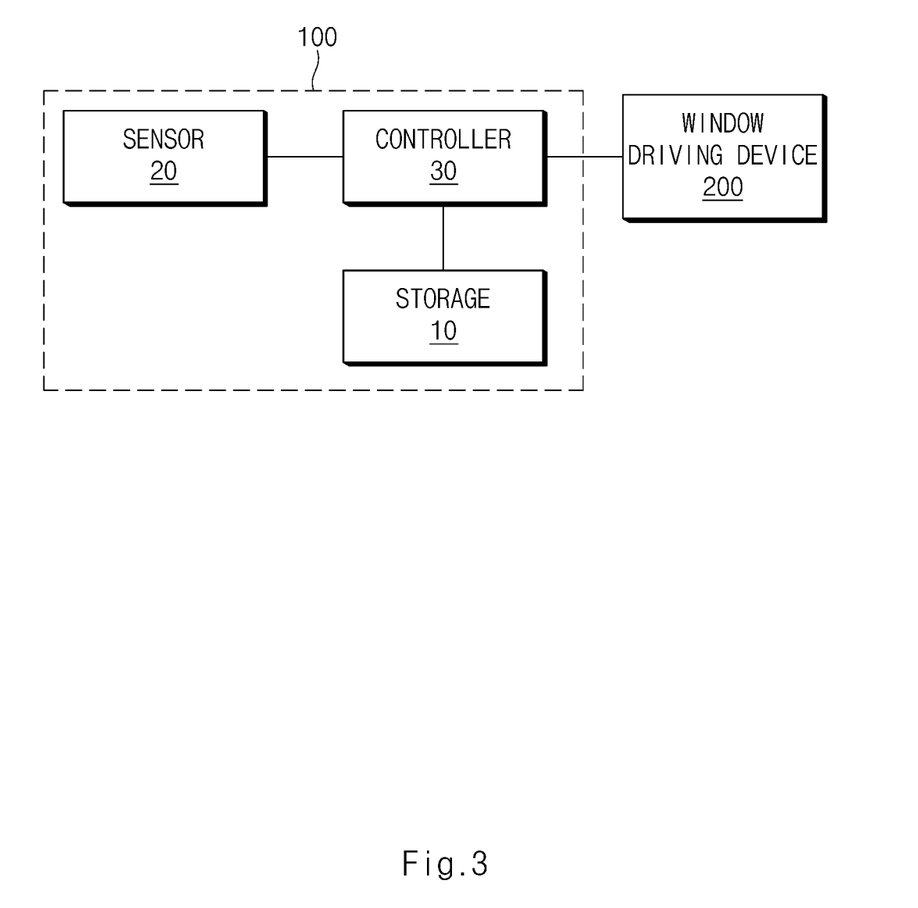
FIG. 3 is a block diagram illustrating a window control apparatus of a vehicle according to various exemplary embodiments of the present invention.

FIG. 3 is a block diagram illustrating a window control apparatus of a vehicle according to various exemplary embodiments of the present invention.

As illustrated in FIG. 3, the window control apparatus 100 of the vehicle according to various exemplary embodiments of the present invention may include storage 10, a sensor 20, and a controller 30. In the instant case, according to a method of implementing the window control apparatus 100 of the vehicle according to various exemplary embodiments of the present invention, each component may be combined with one another to be implemented as one, or some components may be omitted.

Looking at each of the components, first, the storage 10 may store various logics and algorithms, and programs required in a process of subdividing an entire short drop section of a frameless window provided in the vehicle into a plurality of short drop sections, and a process of performing a transition of the frameless window between a full closed state of the frameless window and a plurality of shot drop states, based on the state information of the vehicle.

The storage 10 may include at least one type of a storage medium among a memory such as a flash memory, a hard disk, a micro type memory, and a card type memory (e.g., a SD card (Secure Digital card) or an XD card (eXtream Digital card)), and a memory such as a RAM (Random Access Memory), an SRAM (Static RAM), a ROM (Read-Only Memory), a PROM (Programmable ROM), an EEPROM (Electrically Erasable PROM), a magnetic memory (MRAM), a magnetic disk, and an optical disk type memory.

The sensor 20 refers to a set of sensors that collects state information of a vehicle, may collect lock state information and unlock state information of each door of the vehicle, may collect a manipulation information of an outside handle and a manipulation information of an inside handle, which are provided in each door of the vehicle, may collect open/close state information of each door of the vehicle, and may collect fastening information and unfastening information of each seat belt of the vehicle. The sensor 20 may include a plurality of sensors as illustrated in FIG. 4.

Figure 4:
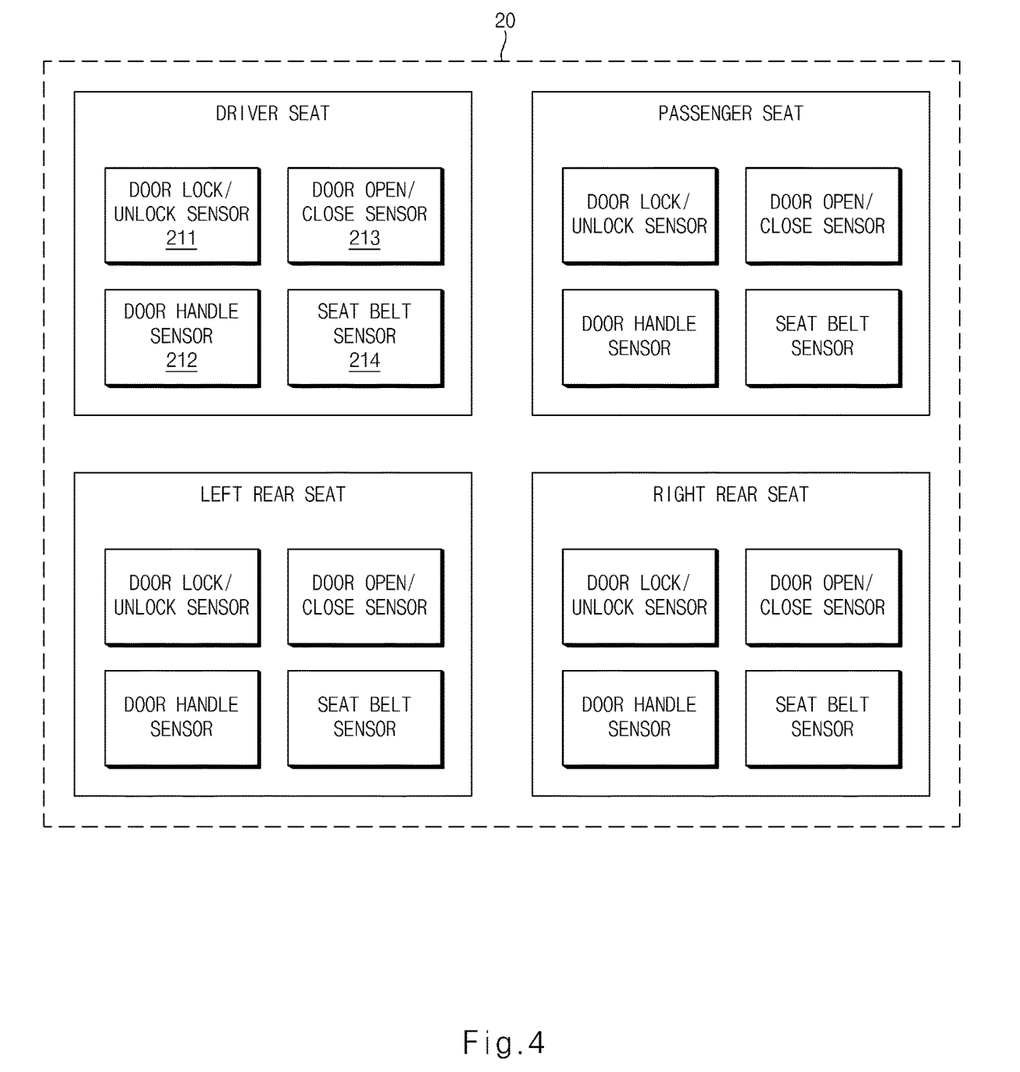
FIG. 4 is a diagram illustrating a detailed configuration of a sensor provided in a window control apparatus of a vehicle according to various exemplary embodiments of the present invention.

FIG. 4 is a diagram illustrating a detailed configuration of a sensor provided in a window control apparatus of a vehicle according to various exemplary embodiments of the present invention.

As illustrated in FIG. 4, the sensor 20 provided in a window control apparatus of a vehicle according to various exemplary embodiments of the present invention may be provided in a driver's seat portion, a front passenger's seat portion, a left rear seat portion, and a right rear seat portion, respectively. Hereinafter, the driver's seat portion will be referred to as an example to help understanding of the present invention.

The sensor 20 may include a door lock/unlock sensor 211, a door handle sensor 212, a door open/close sensor 213, and a seat belt sensor 214.

The door lock/unlock sensor 211 may be implemented with a kind of switch and may detect locking or unlocking of the door. In the instant case, the door lock/unlock sensor 211 may detect a door unlock by a button provided on a door handle, a door unlock by an unlock signal from a smart key, a door unlock by a user's approach with the smart key, and a door unlock by turning off (internal combustion engine vehicles stop an engine, and electric vehicles turn off a start lamp) a vehicle starting. Furthermore, the door lock/unlock sensor 211 may detect a door lock by a lock signal from a smart key, and an automatic door lock by a separation of a user holding the smart key.

The door handle sensor 212 may be implemented with a kind of switch, and may detect a manipulation start, a manipulation in progress, and a manipulation completion of the door handle by the user. That is, the door handle sensor 212 may detect when a user touches the door handle or when a user applies pressure greater than or equal to a reference value to the door handle. For the present reason, the controller 30 may detect a time when a user starts to manipulate the door handle.

The door handle sensor 212 may include an outside door handle sensor and an inside door handle sensor, may detect when the user starts to manipulate the outside door handle through the outside door handle sensor, and may detect when the user starts to manipulate the inside door handle through the inside door handle sensor.

The door open/close sensor 213 may be implemented with a kind of switch and may detect the open/close state of the door.

The seat belt sensor 214 may be implemented with a kind of switch and may detect the fastening and unfastening state of the seat belt.

The controller 30 may perform overall control such that each of the components may perform their functions normally. The controller 30 may be implemented in a form of hardware, may be implemented in a form of software, or may be implemented in a form of a combination of hardware and software. The controller 30 may be implemented as a microprocessor but is not limited thereto.

The controller 30 may perform various controls required in a process of subdividing an entire short drop section of a frameless window provided in the vehicle into a plurality of short drop sections, and performing a transition of the frameless window between a full closed state of the frameless window and a plurality of shot drop states, based on the state information of the vehicle.

Hereinafter, an operation of the controller 30 will be described in detail with reference to FIG. 5.

Figure 5:
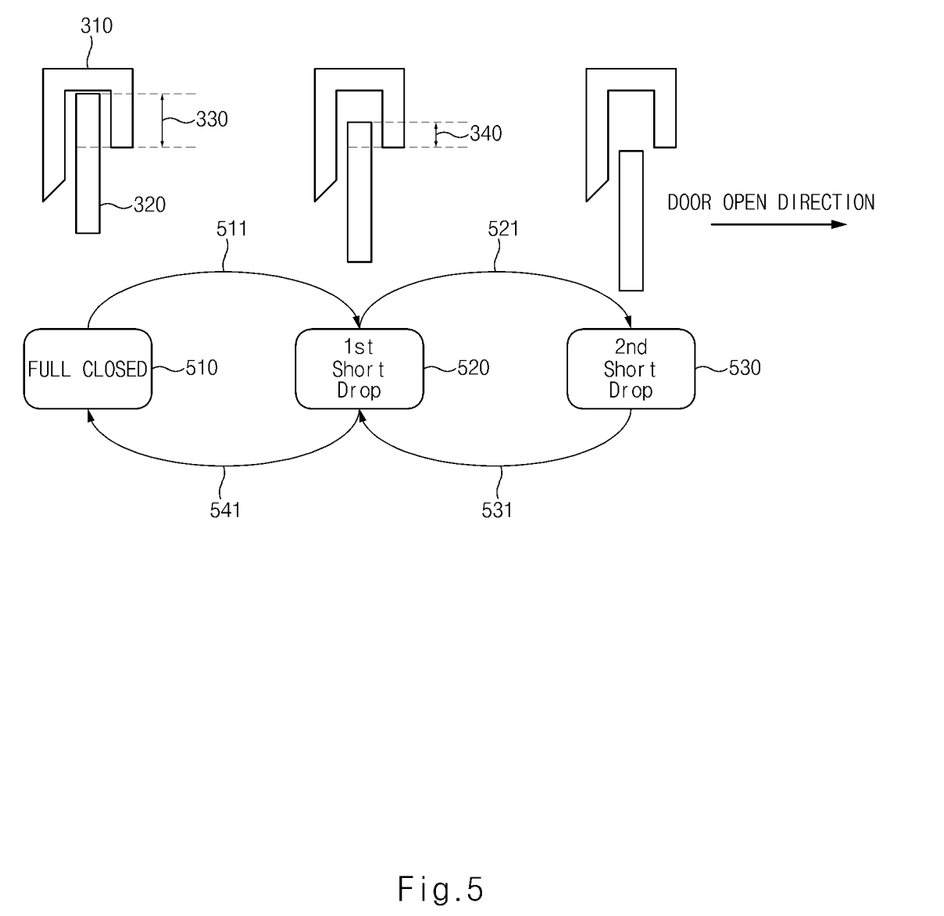
FIG. 5 is a diagram illustrating a process in which a controller provided in a window control apparatus of a vehicle according to various exemplary embodiments of the present invention performs transition of a short drop state of a frameless window.

FIG. 5 is a diagram illustrating a process in which a controller provided in a window control apparatus of a vehicle according to various exemplary embodiments of the present invention performs transition of a short drop state of a frameless window.

In FIG. 5, '310' refers to a frame provided on a vehicle body, '320' refers to window glass 320, and '330' represents a depth of the frame pocket which may completely block external noise and rainwater, and '340' represents a depth of the frame pocket which may partially block external noise and rainwater.

Furthermore, '510' refers to a state in which the window glass 320 is drawn into the pocket of the frame 310 provided on the vehicle body and is in close contact (full close), '520' refers to a state in which the window glass 320 is dropped by a reference value from the pocket of the frame 310 provided on the vehicle body (first short drop), and '530' refers to a state in which the window glass 320 is completely separated from the pocket of the frame 310 provided on the vehicle body (second short drop).

The controller 30 may perform a transition from a full closed state 510 to a first short drop state 520 when an unlocking of the door is detected through the sensor 20 (511). That is, the controller 30 may control the window driving device 200 when the unlocking of the door is detected through the sensor 20 in the full closed state 510 such that the window glass 320 is dropped by a reference value from the pocket of the frame 310 provided in the vehicle body. In the instant case, the unlocking of the door may include both unlocking by a request from an outside of the vehicle as well as unlocking by a request from an interior of the vehicle (an unlock button provided in the interior of the vehicle).

The controller 30 may immediately perform a transition from the first shot drop state 520 to the second shot drop state 530 when a start of a user's door handle manipulation is detected (521). That is, the controller 30 may control the window driving device 200 such that the window glass 320 is completely separated from the pocket of the frame 310 provided on the vehicle body when the start of the user's door handle manipulation is detected through the sensor 20 in the first shot drop state 520. In the instant case, the manipulation of the door handle may include a manipulation of the door handle provided outside the vehicle as well as a manipulation of the door handle provided inside the vehicle. In the instant case, the configuration of the present invention, which transitions to the second shot drop state 530 when the user starts manipulating the door handle, should be differentiated from the conventional configuration in which the entire shot drop starts after the manipulation of the door handle is completed.

The controller 30 may perform a transition from the second shot drop state 530 to the first shot drop state 520 when the closing of the door is detected through the sensor 20 (531). That is, the controller 30 may control the window driving device 200 when the closing of the door is detected through the sensor 20 in the second shot drop state 530 such that the window glass 320 completely separated from the pocket of the frame 310 provided in the vehicle body is raised to a designated position within the pocket of the frame 310. In the instant case, the closing of the door may include a closing of the door after the user gets on as well as a closing of the door after the user gets off.

The controller 30 may perform a transition from the first short drop state 520 to the full closed state 510 when the locking of the door is detected through the sensor 20 (541). That is, the controller 30 may control the window driving device 200 when the locking of the door is detected through the sensor 20 in the first shot drop state 520 such that the window glass 320 located at a designated position within the pocket of the frame 310 provided in the vehicle body is completely drawn into the pocket of the frame 310 to be in close contact with the pocket. In the instant case, the locking of the door may include both a door locking after the user gets on as well as a door locking after the user gets off.

Hereinafter, a process in which the controller 30 controls the frameless window 21 for each scenario will be described.

First Scenario when User Gets on

When the user unlocks the door, the controller 30 performs a transition from the full closed state 510 of the frameless window 21 to the first short drop state 520 (511), and the controller 30 performs a transition from the first shot drop state 520 to the second shot drop state 530 of the frameless window 21(521) when the user starts to manipulate the outside door handle. Thereafter, when the user closes the door, the controller 30 performs a transition from the second shot drop state 530 to the first shot drop state 520 of the frameless window 21(531), and the controller 30 performs a transition from the first shot drop state 520 to the full closed state 510 of the frameless window 21 when the vehicle's speed exceeds a reference speed and the door is locked (541).

Second Scenario when the User Gets on

When the user unlocks the door, the controller 30 performs a transition from the full closed state 510 to the first short drop state 520 of the frameless window 21 (511), and the controller 30 performs a transition from the first shot drop state 520 to the second shot drop state 530 of the frameless window 21 when the user starts to manipulate the outside door handle (521). Thereafter, when the user fastens the seat belt, the controller 30 performs a transition from the second shot drop state 530 to the first shot drop state 520 of the frameless window 21(531), and the controller 30 performs a transition from the first short drop state 520 to the full closed state 510 of the frameless window 21 when the vehicle speed exceeds a reference speed and the door is locked (541).

First Scenario when the User Gets Off

When the user unlocks the door, the controller 30 performs a transition from the full closed state 510 to the first short drop state 520 of the frameless window 21 (511), and the controller 30 performs a transition from the first shot drop state 520 to the second shot drop state 530 of the frameless window 21(521) when the user starts to manipulate the inside door handle. Thereafter, when the user closes the door, the controller 30 performs a transition from the second short drop state 530 to the first short drop state 520 of the frameless window 21(531), and the controller 30 performs a transition from the first shot drop state 520 to the full closed state 510 of the frameless window 21 when the user is spaced from the vehicle and the door is locked (541).

Second Scenario when the User Gets Off

When the user releases fastening of the seat belt, the controller 30 performs a transition from the full closed state 510 to the first short drop state 520 of the frameless window 21 (511), and the controller 30 performs a transition from the first shot drop state 520 to the second shot drop state 530 of the frameless window 21 when the user starts to manipulate the inside door handle (521). Thereafter, when the user closes the door, the controller 30 performs a transition from the second shot drop state 530 to the first shot drop state 520 of the frameless window 21(531), and the controller 30 performs a transition from the first shot drop state 520 to the full closed state 510 of the frameless window 21 when the user holding the smart key is spaced from the vehicle and the door is lock state (541).

Figure 6:
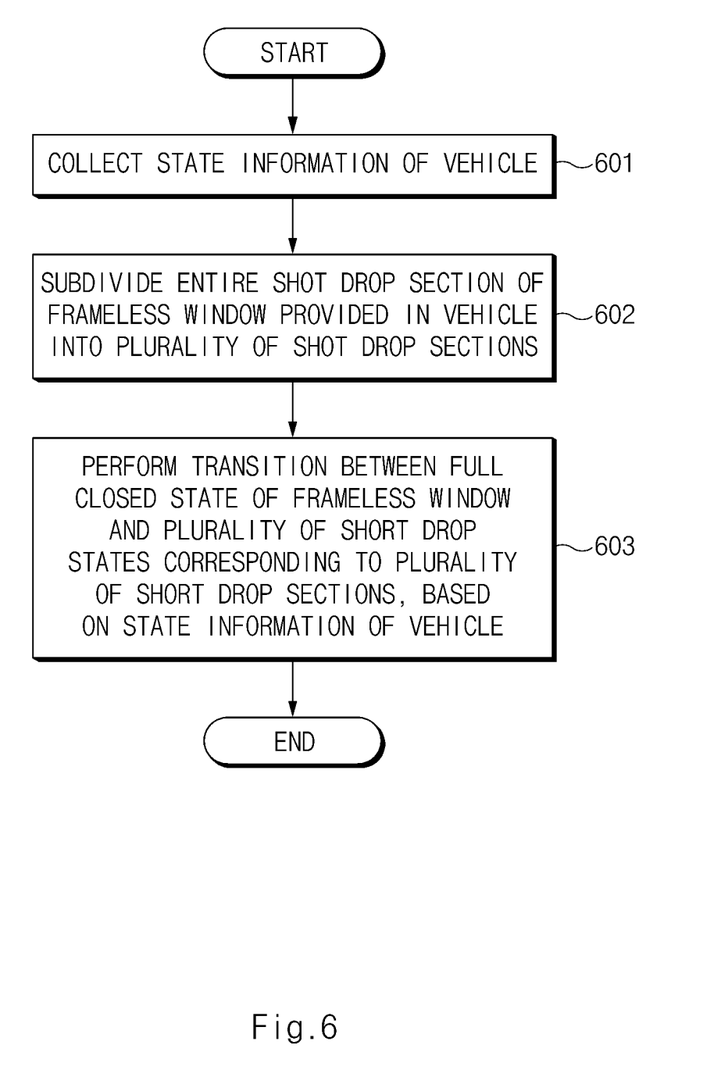
FIG. 6 is a flowchart illustrating a window control method of a vehicle according to various exemplary embodiments of the present invention.

FIG. 6 is a flowchart illustrating a window control method of a vehicle according to various exemplary embodiments of the present invention.

First, the sensor 20 collects the state information of the vehicle (601).

Thereafter, the controller 30 subdivides the entire shot drop section of the frameless window provided in the vehicle into a plurality of shot drop sections (602).

Thereafter, the controller 30 performs a transition of the frameless window between the full closed state of the frameless window and a plurality of short drop states corresponding to the plurality of short drop sections, based on the state information of the vehicle (603).

Figure 7:
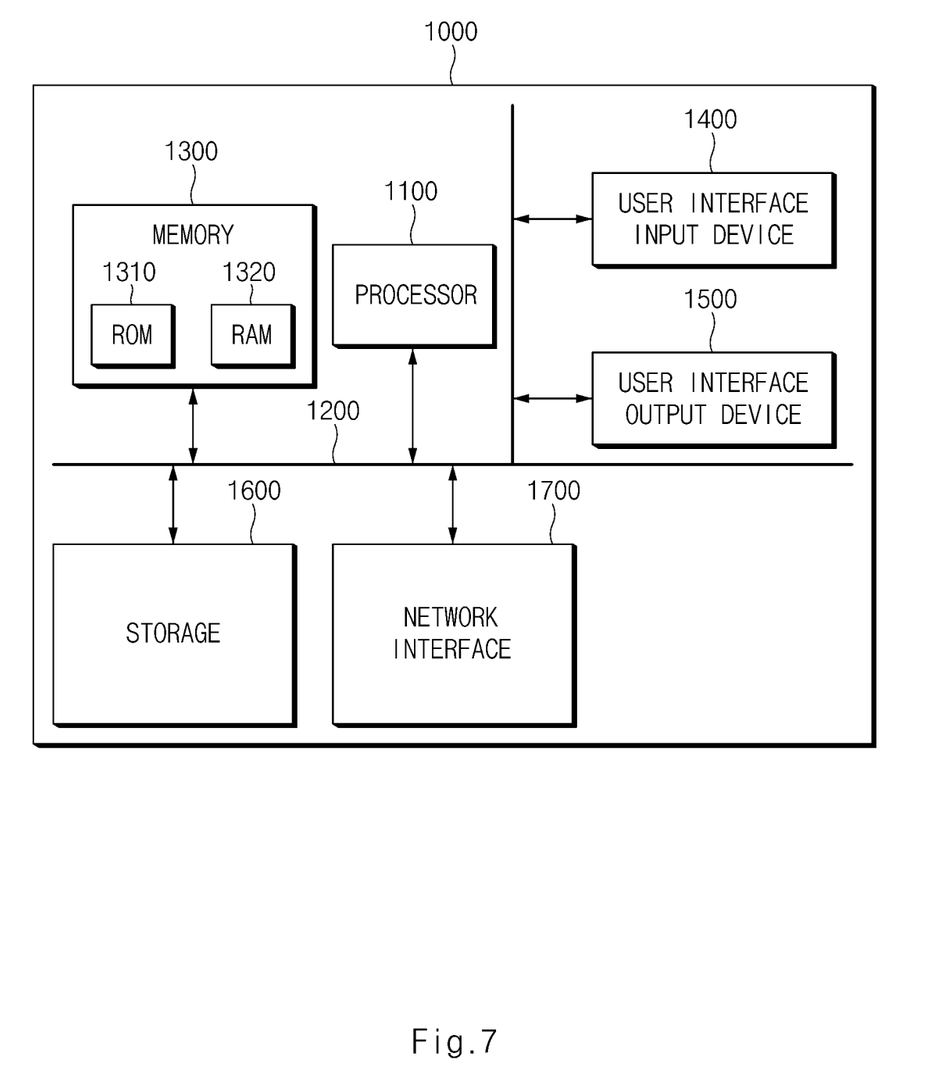
FIG. 7 is a block diagram illustrating a computing system for executing a window control method of a vehicle according to various exemplary embodiments of the present invention.

FIG. 7 is a block diagram illustrating a computing system for executing a window control method of a vehicle according to various exemplary embodiments of the present invention.

Referring to FIG. 7, the above-described method for controlling a window of a vehicle according to various exemplary embodiments of the present invention may be implemented through a computing system. A computing system 1000 may include at least one processor 1100, a memory 1300, a user interface input device 1400, a user interface output device 1500, storage 1600, a network interface 1700, which are connected through a system bus 1200.

The processor 1100 may be a central processing unit (CPU) or a semiconductor device that executes processing on instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the method or the steps of algorithm described in connection with the exemplary embodiments included herein may be implemented directly in hardware, a software module, or a combination of the two, which is executed by the processor 1100. The software module may reside in a storage medium (i.e., the memory 1300 and/or the storage 1600) such as a RAM, a flash memory, a ROM, an EPROM, an EEPROM, a register, a hard disk, a removable disk, and a CD-ROM. The storage medium as an example is coupled to the processor 1100, the processor 1100 may read information from, and write information to, the storage medium. Alternatively, the storage medium may be integrated with the processor 1100. The processor and storage medium may reside within an application specific integrated circuit (ASIC). The ASIC may reside within the user terminal. Alternatively, the processor and storage medium may reside as separate components within the user terminal.

According to various exemplary embodiments of the present invention, a window control apparatus of a vehicle and a method thereof may open the frameless window without being caught in the frame while maintaining the pocket depth of the frame provided in the vehicle body, by subdividing an entire short drop section of a frameless window provided in the vehicle into a plurality of short drop sections, and performing a transition of the frameless window between a full closed state of the frameless window and a plurality of shot drop states, based on the state information of the vehicle.

The above description is merely illustrative of the technical idea of the present invention, and those of ordinary skill in the art to which various exemplary embodiments of the present invention pertains will be able to make various modifications and variations without departing from the essential characteristics of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A window control apparatus of a vehicle, the window control apparatus comprising:
   a sensor configured to collect state information related to the vehicle; and
   a controller configured to subdivide an entire short drop section of a frameless window provided in the vehicle into a plurality of short drop sections, and to perform a transition of the frameless window between a full closed state of the frameless window and a plurality of shot drop states corresponding to the plurality of shot drop sections, according to the state information related to the vehicle,
   wherein the plurality of shot drop states includes a first short drop state and a second short drop state, and
   wherein the controller is configured to divide a state of the frameless window into the full closed state in which the frameless window is drawn into a pocket of a frame provided on a body of the vehicle and is in close contact with the pocket, the first short drop state in which the frameless window is dropped by a reference value from the pocket of the frame, and the second shot drop state in which the frameless window is completely separated from the pocket of the frame,
   wherein the controller is configured to perform a transition of the frameless window from the full closed state to the first short drop state when a door unlocking of the vehicle is detected, a transition of the frameless window from the first short drop state to the second short drop state when the controller determines that a user starts to manipulate an outside door handle of the vehicle, a transition of the frameless window from the second short drop state to the first short drop state when a door closing of the vehicle is detected, and a transition of the frameless window from the first short drop state to the full closed state when a door locking of the vehicle is detected.

2. The window control apparatus of claim 1, wherein the controller is configured to perform the transition of the frameless window from the full closed state to the first short drop state when the door unlocking of the vehicle is detected, the transition of the frameless window from the first short drop state to the second short drop state when the controller determines that the user starts to manipulate the outside door handle of the vehicle, the transition of the frameless window from the second short drop state to the first short drop state when a seat belt fastening of the vehicle is detected, and the transition of the frameless window from the first short drop state to the full closed state when the door locking of the vehicle is detected.

3. The window control apparatus of claim 1, wherein the controller is configured to perform the transition of the frameless window from the full closed state to the first short drop state when the door unlocking of the vehicle is detected, the transition of the frameless window from the first short drop state to the second short drop state when the controller determines that the user starts to manipulate an inside door handle of the vehicle, the transition of the frameless window from the second short drop state to the first short drop state when the door closing of the vehicle is detected, and the transition of the frameless window from the first short drop state to the full closed state when the door locking of the vehicle is detected.

4. The window control apparatus of claim 1, wherein the controller is configured to perform the transition of the frameless window from the full closed state to the first short drop state when a seat belt fastening of the vehicle is detected, the transition of the frameless window from the first short drop state to the second short drop state when the controller determines that the user starts to manipulate an inside door handle of the vehicle, the transition of the frameless window from the second short drop state to first short drop state when the door closing of the vehicle is detected, and the transition of the frameless window from the first short drop state to the full closed state when the door locking of the vehicle is detected.

5. A window control method of a vehicle, the window control method comprising:
  collecting, by a sensor, state information related to the vehicle; and
  subdividing, by a controller, an entire short drop section of a frameless window provided in the vehicle into a plurality of short drop sections, and performing, by the controller, a transition of the frameless window between a full closed state of the frameless window and a plurality of shot drop states corresponding to the plurality of shot drop sections, according to the state information related to the vehicle,
  wherein the plurality of shot drop states includes a first short drop state and a second short drop state, and
  wherein the performing of the transition includes dividing a state of the frameless window into the full closed state in which the frameless window is drawn into a pocket of a frame provided on a body of the vehicle and is in close contact with the pocket, the first short drop state in which the frameless window is dropped by a reference value from the pocket of the frame, and the second shot drop state in which the frameless window is completely separated from the pocket of the frame,
  wherein the performing of the transition includes:
    performing a transition of the frameless window from the full closed state to the first short drop state when a door unlocking of the vehicle is detected;
    performing a transition of the frameless window from the first short drop state to the second short drop state when the controller determines that a user starts to manipulate an outside door handle of the vehicle;
    performing a transition of the frameless window from the second short drop state to the first short drop state when a door closing of the vehicle is detected; and
    performing a transition of the frameless window from the first short drop state to the full closed state when a door locking of the vehicle is detected.

6. The window control method of claim 5, wherein the performing of the transition includes:
  performing the transition of the frameless window from the full closed state to the first short drop state when the door unlocking of the vehicle is detected;
  performing the transition of the frameless window from the first short drop state to the second short drop state when the controller determines that the user starts to manipulate the outside door handle of the vehicle;
  performing the transition of the frameless window from the second short drop state to the first short drop state when a seat belt fastening of the vehicle is detected; and
  performing the transition of the frameless window from the first short drop state to the full closed state when the door locking of the vehicle is detected.

7. The window control method of claim 5, wherein the performing of the transition includes:
  performing the transition of the frameless window from the full closed state to the first short drop state when the door unlocking of the vehicle is detected;
  performing the transition of the frameless window from the first short drop state to the second short drop state when the controller determines that the user starts to manipulate an inside door handle of the vehicle;
  performing the transition of the frameless window from the second short drop state to the first short drop state when the door closing of the vehicle is detected; and
  performing the transition of the frameless window from the first short drop state to the full closed state when the door locking of the vehicle is detected.

8. The window control method of claim 5, wherein the performing of the transition includes:
  performing the transition of the frameless window from the full closed state to the first short drop state when a seat belt fastening of the vehicle is detected;
  performing the transition of the frameless window from the first short drop state to the second short drop state when the controller determines that the user starts to manipulate an inside door handle of the vehicle;
  performing the transition of the frameless window from the second short drop state to first short drop state when the door closing of the vehicle is detected; and
  performing the transition of the frameless window from the first short drop state to the full closed state when the door locking of the vehicle is detected.

* * * * *